United States Patent
Schmid

(10) Patent No.: US 9,480,264 B2
(45) Date of Patent: Nov. 1, 2016

(54) DEVICE AND METHOD FOR CONTROLLING A FILLING MACHINE

(71) Applicant: ALBERT HANDTMANN MASCHINENFABRIK GMBH & CO. KG, Biberach (DE)

(72) Inventor: Klaus Schmid, Riedlingen (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 340 days.

(21) Appl. No.: 14/195,563

(22) Filed: Mar. 3, 2014

(65) Prior Publication Data
US 2014/0287664 A1 Sep. 25, 2014

(30) Foreign Application Priority Data
Mar. 25, 2013 (EP) ..................................... 13160903

(51) Int. Cl.
| A22C 11/00 | (2006.01) |
| A22C 11/02 | (2006.01) |
| A22C 11/12 | (2006.01) |
| A22C 11/10 | (2006.01) |

(52) U.S. Cl.
CPC ............ *A22C 11/02* (2013.01); *A22C 11/0245* (2013.01); *A22C 11/104* (2013.01); *A22C 11/125* (2013.01)

(58) Field of Classification Search
CPC .. A22C 11/0245; A22C 11/02; A22C 11/006
USPC ........................ 452/30–32, 35–37, 46–48, 51
See application file for complete search history.

(56) References Cited

U.S. PATENT DOCUMENTS

| 4,044,426 A | * | 8/1977 | Kupcikevicius ... | A22C 11/0245 452/31 |
| 4,437,209 A | * | 3/1984 | Duroyon ............ | A22C 11/0245 452/32 |
| 4,773,128 A | * | 9/1988 | Stanley .............. | A22C 11/0245 452/31 |
| 5,405,288 A | * | 4/1995 | Stanley ................ | A22C 11/125 29/243.56 |
| 5,890,955 A | * | 4/1999 | Stanley .................. | A22C 11/02 452/48 |
| 7,618,307 B2 | * | 11/2009 | Gladh .................. | A22C 11/104 452/51 |
| 7,666,071 B2 | * | 2/2010 | Nakamura ......... | A22C 11/0218 452/36 |
| 8,308,533 B2 | * | 11/2012 | Haslacher ............. | A22C 11/00 452/32 |
| 8,540,555 B2 | * | 9/2013 | Reitz .................... | A22C 11/127 452/46 |
| 8,579,682 B2 | * | 11/2013 | Ebert ................... | A22C 11/125 452/48 |
| 8,657,654 B2 | * | 2/2014 | Ebert ..................... | A22C 11/02 452/35 |
| 2007/0180795 A1 | | 8/2007 | Topfer | |

FOREIGN PATENT DOCUMENTS

| EP | 1607000 A1 | 12/2005 |
| EP | 1844659 A1 | 10/2007 |

OTHER PUBLICATIONS

European Search Report for No. EP 13 16 0903, dated Sep. 8, 2013.

* cited by examiner

*Primary Examiner* — Richard Price, Jr.
(74) *Attorney, Agent, or Firm* — Marshall, Gerstein & Borun LLP

(57) ABSTRACT

A method and a device for controlling a filling machine with a clipping machine, the clipping machine and the filling machine exchanging process data via a communication interface, where functions of the clipping machine, in particular the movement profile of opposed clipper scissors, and functions of the filling machine, in particular the speed profile of a feed mechanism, are automatically adjusted with respect to each other by at least one control system.

21 Claims, 8 Drawing Sheets

DEVICE AND METHOD FOR CONTROLLING A FILLING MACHINE

CROSS-REFERENCE TO RELATED APPLICATION

The present application claims priority to European Application No. 13 160 903.4, filed Mar. 25, 2013. The priority application, EPO 13 160 903.4, is hereby incorporated by reference

FIELD OF THE DISCLOSURE

The present disclosure relates to a method for controlling a filling machine with a clipping machine and a corresponding device.

BACKGROUND

In sausage production, it is known to separate a sausage length filled by a filling machine with so-called clipper scissors, wherein the pasty mass is displaced by the clipper scissors which move towards each other. Then, a so-called clip or double clip is inserted between the clipper scissors which closes the individual sausage portions. The sausages may then be cut through between the double clip.

Sausage production with a clipping machine may be divided into the following process steps:

1. Filling machine: A feed mechanism ejects a portion and stops after set volume is reached.
2. Clipping machine: Displacement scissors move towards each other and close then product is displaced.
3. Clipping machine: The separation point may be expanded while the displacement scissors move apart.
4. Clipping machine: Placing a clip which closes the portions.
5. Clipping machine: The displacement scissors open again.

These steps are repeated cyclically.

In industrial sausage production, a preferably high portioning accuracy with a simultaneous high portioning cycle is demanded. To achieve this, it is required to match the starting and stopping movements of the filling and clipping machines with respect to the superposition of the movement of the displacement scissors and the movement of the feed mechanism, the speed and acceleration of the displacement scissors and of the feed mechanism. In particular, the transition between the above mentioned steps 1 and 2 and 5 and 1 must be optimized. A change of the movement profile of the filling machine also requires an adaptation of the movement of the clipper scissors and vice-versa to ensure optimal portioning. These problems are strongest with a high portioning cycle and a small portioning volume (ratio of portioning time to portioning pause <3).

There already exists a functioning, but very error-prone and complex/expensive solution for matching the functions of the clipping machine and the filling machine.

The adjustment of speed, acceleration and superposition is made separately at the filling and clipping machines. While it is possible with the existing parameters to adjust the synchronization between the filling and clipping machines, adjustment is in practice performed step by step and takes a lot of time.

For example, as soon as the speed is adjusted at the filling machine, this time-consuming readjustment must be repeated, which is often not done in practice and may lead in turn to incorrectly adjusted machines.

SUMMARY OF THE DISCLOSURE

Starting from this situation, the object underlying the present disclosure is to provide a method and a device by which a filling machine with a clipping machine may be controlled in a simple and reliable manner, and in particular the functions of the filling and clipping machines may be easily and reliably adjusted to each other.

According to the present disclosure, in the method for controlling a filling machine with a clipping machine, the clipping machine and the filling machine may exchange process data, such as process parameters, start signals, etc., via a communication interface. Communication interface here means at least one communication interface. By the communication possibility between the clipping machine and the filling machine, functions of the clipping machine, in particular the movement profile of opposed clipper scissors, and functions of the filling machine, in particular the speed profile of a feed mechanism, may be automatically matched by a controlling system. This means that in case of changes of parameters concerning the feed mechanism of the filling machine, the control system may then automatically adapt the movement profile of the clipper scissors without any complicated adjustment at the clipping machine being required. A control system means that either a combined control system for the filling machine and the clipping machine is provided, or that the filling machine and the clipping machine may each have a separate control system.

The movement profile of the clipper scissors represents the degree of their movements in response to time.

The speed profile of the feed mechanism represents the feeding speed or filling speed of the feed mechanism, e. g. the rotational speed of a vane pump, in response to time.

By the exchange of information or signals between the clipping machine and the filling machine or their control systems, a simple adjustment may be accomplished. One may thus prevent that the ejected portion is decelerated by the scissors in an undefined manner. One may moreover prevent the product ejection from driving against the closed scissors at the start.

When filling parameters are changed, for example the filling speed, the speed profile of the feed mechanism and the movement profile of the clipper scissors as well as their temporal superposition are automatically recalculated. By the exchange of information via the communication interface, the manual readjustment of the clipping and filling machines is eliminated.

According to the present disclosure filling parameters for the function of the feed mechanism of the filling machine, and clipper parameters for the function of the clipping machine may be set. Here, the individual parameters may be entered by the operator or stored in advance in the factory, for example. A first control system may set up the speed profile of the feed mechanism in response to the filling parameters. A second control system may determine or calculate a movement profile for the clipper scissors in response to the clipper parameters and the speed profile of the feed mechanism. Here, the first control system may be, for example, the filling machine control system, and the second control system the clipping machine control system. However, it is also possible to combine both control systems in one control unit.

In this manner, by the known speed profile of the feed mechanism, the ideal matching movement profile for the clipper scissors may be calculated.

As clipper parameters, at least the following or equivalent parameters are set: sausage caliber, speed of clipper scissors, optionally geometry of scissors. According to a preferred embodiment, the acceleration (or deceleration) of the clipper scissors by which the clipper scissors may be brought to a certain speed may additionally be entered. Thus, for example the ramp times of the clipper scissor speed may be adjusted during the portioning time such that the clipper scissor speed does not become zero, which will be illustrated more in detail below. Sausage caliber is the diameter of the portion to be produced. The clipper scissor speed is either the speed of the clipper scissor drive, for example the rotational speed of the drive, or the speed of the clipper scissors perpendicular to the central axis of the sausage length. Furthermore, the possibility of entering which scissor geometry from a certain predetermined number of different scissor geometries is used may be provided. The different scissors have different sizes or recesses of different sizes and shapes. When the geometry of the scissors is known, one may then exactly calculate, for example, at which position of the clipper scissors with respect to the sausage length, or at which distance of the clipper scissors with respect to each other, a sausage with a certain sausage caliber fits through. Of course, with a fixed scissor geometry, no corresponding input is required; the corresponding parameters are then stored in the control system.

As filling parameters, for example the following parameters or corresponding equivalent parameters may be set: portion volume, this means the volume of pasty mass which is ejected during a portioning time for a portion, filling speed, i. e., for example, the desired volume per time which is to be ejected, or the rotational speed of the feed mechanism for a certain feed mechanism geometry, i. e. the size and number of the vanes in the feed mechanism rotor. For example, a percentage value for a given maximum possible filling speed of a filling machine may be entered. Furthermore, the acceleration may be entered, i. e. the acceleration of the feed mechanism from zero to the entered filling speed.

Thus, the filling machine may determine the movement profile for the feed mechanism from the default settings of portioning volume, filling speed and acceleration. The result, for example portioning time, filling speed and ramp time (i. e. the acceleration duration necessary for the feed mechanism to be accelerated to the filling speed and decelerated again to zero during the portioning time) may be transmitted via the communication interface to the clipper control system. The clipper control system may calculate the optimal scissor movement and the superposition of the movements on the basis of the now known feed mechanism movement.

The speed profile of the feed mechanism is repeated in feeding cycles, where the starting time of a feed mechanism cycle is determined in response to the position of the clipper scissors. This means that according to a preferred embodiment, the controlling system, in particular the second control system, sends a start signal to the feed mechanism.

At the earliest when the distance of the clipper scissors with respect to each other is sufficiently long for a produced sausage caliber to fit through the opening of the clipper scissors, the controlling system, in particular the second control system, may send a start signal to the feed mechanism.

In the central region of the sausage portion, the produced sausage caliber corresponds to the set sausage caliber or the entered sausage caliber. In the end regions at the round ends of the sausage, however, the sausage portion has a somewhat smaller diameter. So, the start signal may be generated when the predetermined entered sausage caliber as produced sausage caliber fits through the opening of the clipper scissors. The feed mechanism, however, may also be started earlier, i. e. when the produced sausage caliber having a smaller diameter in the starting region fits through the opening between the scissors. Then, the controlling system may already generate a start signal when the clipper scissors are at a distance with respect to each other which corresponds to the produced sausage caliber in the starting region of the sausage portion. Thus, the feed mechanism may even be started somewhat earlier.

Thus, the filling and clipping machines may be optimally synchronized which is also advantageous in particular with high portioning cycles and small portion volumes as it is always ensured that the portion is not decelerated by the scissors in an undefined manner and the filling ejection does not drive against closed scissors during the start.

Basically, the parameters for the clipping machine may be entered at an operator panel of the clipping machine and the filling machine parameters at the operator panel of the filling machine. However, it is particularly advantageous if both the parameters for the clipping machine and the parameters for the filling machine may be entered at an operator panel of the clipping machine because a common operator panel for the clipping machine and the filling machine facilitates the work for the operator who is staying in the region of the clipping machine during the production process. This is possible due to the communication interface.

Preferably, the speed profile of the feed mechanism indicates its speed in response to time, where during a portioning time $t_{Portion}$, in a first ramp section during a first ramp time $t_{up}$, the speed increases from a minimum filling speed $V_{min}$ to a maximum filling speed $V_{fill}$ and is kept at this high level for a filling time $t_{Full}$, and is decreased again to $V_{min}$ in a second ramp section during a second ramp time $t_{Ab}$, where preferably $V_{min}=0$. A portioning pause follows the portioning time where during the time segment $t_{Pause}$, the filling speed corresponds to $V_{min}$ and is preferably 0, so that no portion ejection is effected. Advantageously, during the portioning time $T_{Portion}$, the speed of the clipper scissors $4a$, $b$ is decreased to a passage speed $V_{passage}$ and then increased again, where $V_{passage} \neq 0$.

The fact that the passage speed $V_{passage}$ does not become 0 is particularly advantageous for the drive of the clipper scissors as it is tight and sluggish, so that an interruption and new start of the drive may be prevented. This embodiment is particularly suited for small portions, for example of 1 to 30 cm$^3$.

With larger sausage portions, for example of a range from 30 cm$^3$, the speed of the clipper scissors may also be decreased to zero during the portioning time $t_{Portion}$ during a first period ($t_{Clipstopp}$), and kept at zero during a certain period $t_{Clippause}$ and then be increased again during a second time segment $t_{rise}$. This may become necessary with very long portioning times. To avoid a stop of the clipper scissors even with longer, i.e. larger portions, the speed pattern of the clipper scissors may be selected such that the decreased speed $V_{passage} \neq 0$ for long ramp sections, while it is simultaneously ensured that at the end of the portioning time, after the second ramp time $t_{down}$ of the speed profile of the feed mechanism, the scissors have again assumed such a position with respect to each other that the produced sausage caliber fits through.

The movement profile of the clipper scissors represents the degree of movement of the clipper scissors in response to time, i. e. the course of the movement of the scissors towards the sausage length from a maximally superposed position to a maximum distance of the clipper scissors. During a portioning time $t_{Portion}$ of the feed mechanism, the clipper scissors move apart to a maximum distance with respect to each other, whereupon they move towards each other again, the scissors having, during the portioning time $t_{Portion}$ of the feed mechanism, such a distance with respect to each other that the produced sausage caliber fits through the opening between the scissors. It is thus always ensured that the ejected product is not decelerated by the clipper scissors during the portioning time.

During the portioning pause of the feed mechanism, the clipper scissors move towards each other such that the sausage length is cut through, whereupon the clip or the double clip is placed between the clipper scissors and whereupon the scissors move apart again, the scissors having such a distance with respect to each other at the beginning of the following portioning time that the predetermined sausage caliber fits through the opening between the scissors. Before the clip is placed, preferably both clipper scissors are moved apart relative to each other, seen in the direction of transport, such that the point of cut is expanded so that the clip may be placed. It is possible to then separate the sausage portion at this point. The steps of expanding, clipping, separating are independent of the speed profile of the feed mechanism.

The device according to the present disclosure for performing the method comprises a filling machine and a clipping machine as well as a communication interface between the filling machine and the clipping machine for exchanging process data, and at least one controlling system which automatically matches functions of the clipping machine, in particular the movement profile of the opposed clipper scissors, and functions of the filling machine, in particular the speed profile of a feed mechanism. Opposed means here on opposite sides of the sausage length. The controlling system may be designed such that it comprises a first control system which sets up, in response to entered filling parameters, the speed profile of the feed mechanism, and a second control system which determines, in response to entered clipper parameters and the speed profile of the feed mechanism, a movement profile for the clipper scissors. The speed profile of the clipper scissors is also matched.

The speed and movement of the clipper scissors during expanding, clipping and separating is independent of the filling profile, the speed of the clipper scissors perpendicular to the sausage length being preferably zero or at least very small.

According to the present disclosure, the controlling system, in particular the clipper control system, is designed such that the starting time of a feed mechanism cycle is determined in response to the position of the clipper scissors, and a start signal is sent to the feed mechanism at the earliest when the distance of the clipper scissors is sufficiently long for a produced sausage caliber to fit through the opening of the clipper scissors. Thus, the starting time of the movement profile of the clipper scissors may be ideally coordinated at the starting time of the speed profile of the filler.

BRIEF DESCRIPTION OF THE SEVERAL VIEWS OF THE DRAWINGS

The disclosure will be illustrated below with reference to the following figures.

DETAILED DESCRIPTION OF THE PREFERRED EMBODIMENTS

Figure 1:
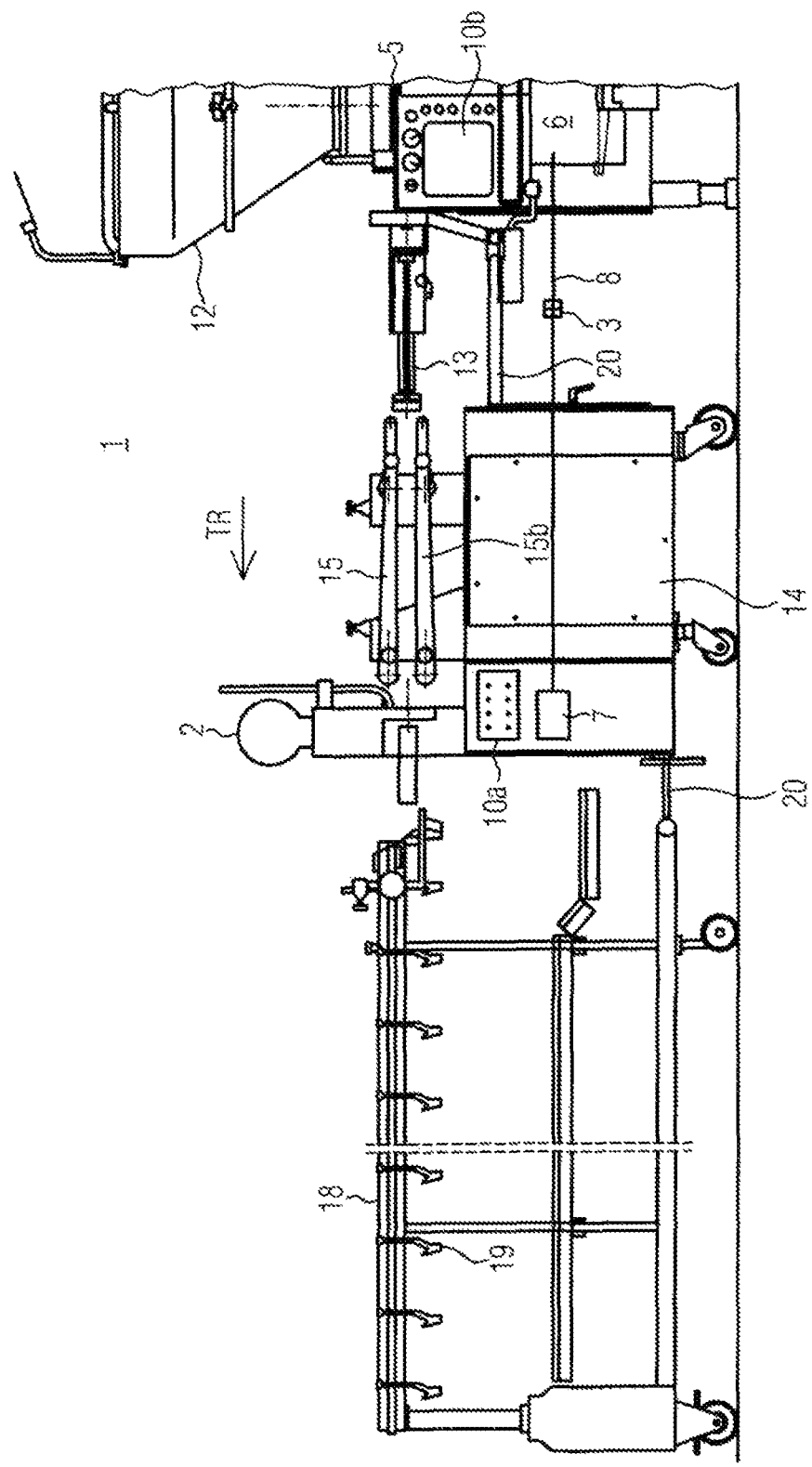
FIG. 1 roughly schematically shows a filling line of an embodiment of the present disclosure.

FIG. 1 shows in a schematic representation a filling machine 1 with a clipping machine 2. The filling machine 1 comprises, as is known, a hopper 12 in which for example a pasty mass, such as sausage meat, is ejected via a feed mechanism 5 located below it, for example in the form of a vane pump, through a filling tube 13 into a sausage casing. For example, a transport device is disposed downstream of the filling machine 1 in the direction of transport $T_R$ which comprises two circulating conveyor belts 15a, 15b between which the filled sausage length is transported. Here, a clipping machine is disposed in the direction of transport $T_R$ downstream of the transport device. The clipping machine, however, could also be disposed upstream of the transport device with the conveyor belts 15a, b in the direction of transport. In this particular example, a hang-up 18 is finally arranged in the direction of transport $T_R$, which may receive and transport further individual sausages or sausage portions at its hooks 19.

The construction shown in FIG. 1 is only given by way of example. Preferably, the clipping device is disposed directly behind the filling tube 13 without any preceding transport device 15. It is also possible not to provide any suspension device 18 but to produce the sausage portions directly on a table instead.

Individual apparatuses of the filling line may be connected to each other with mechanical connectors 20.

The clipping machine 2 serves for placing a clip or a double clip between two subsequent sausage portions. Clipping machines are already known from prior art, so that a detailed description of the clipping machine 2 is omitted here. According to the present disclosure, a communication interface 3 is provided between the clipping machine 2 and the filling machine 1, or between the control system 7 of the clipping machine 2 and the filling machine 1, for transmitting data. For data transmission, a cable 8 is provided here which comprises, for example, a plug connector as interface 3. Corresponding data may also be transmitted, however, via radio transmission (e. g. WLAN, etc.). Thus, information may be exchanged via the interface 3, in particular via a bus communication between the clipping machine 2 and the filling machine 1.

Here, the clipping machine 2 and the filling machine 1 each have a separate control system 7, 6 in the respective machine. However, it is also possible for both control systems to be combined in one control unit, for example in the filling machine.

The clipping machine has an operator panel 10a via which process parameters concerning the clipping machine may be entered. According to a preferred embodiment, however, it is advantageous for the operator panel 10a to be designed such that parameters with respect to the filling machine 1 (and optionally also further apparatuses of the filling line) may also be entered. This is particularly advantageous as the operator is moving in the region of the clipper 2 and may then simultaneously enter all parameters for the process at a central input unit. This is possible because there is a communication interface 3 for controlling 6 the filling machine 1. However, the filling machine 1 may also comprise, in addition or as an alternative, a corresponding operator panel 10b into which the parameters for the filling machine 1 and/or the parameters for the clipping machine 2 (and optionally for further apparatuses) may be entered.

Figure 2:
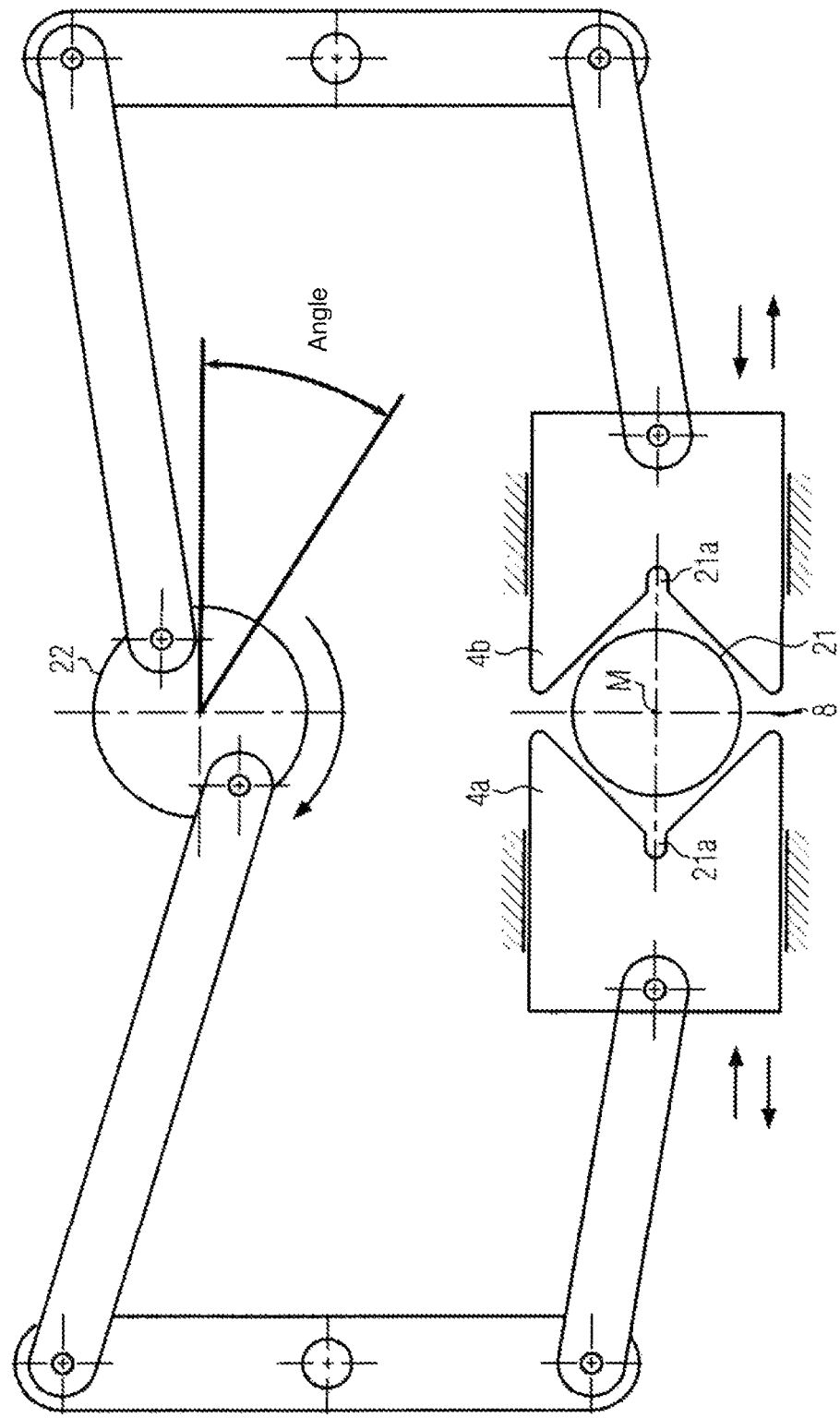
FIG. 2 roughly schematically shows a possible drive for the clipper scissors.
Figure 7A:
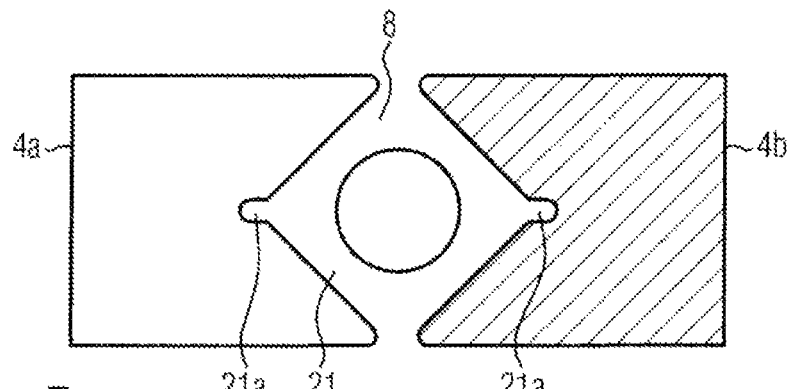
FIG. 7a roughly schematically shows two clipper scissors in a maximally opened position.
Figure 7B:
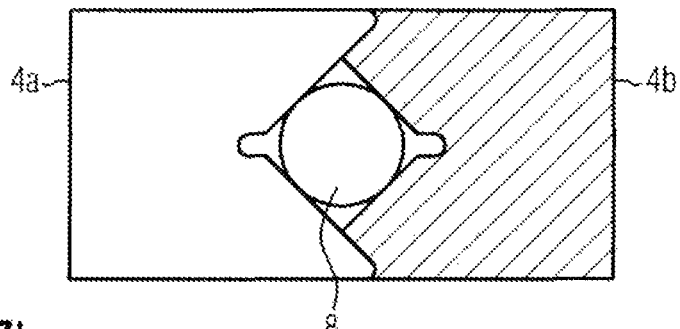
FIG. 7b roughly schematically shows two clipper scissors in a position in which the predetermined sausage portion just fits through the opening between the clipper scissors.

As can be taken in particular from FIGS. 2 and 7, the clipping machine comprises two clipper scissors 4a, b which, as is shown by the arrows in FIG. 2, may be moved in the direction of the central axis M of the sausage length or the device towards the sausage length and away from it. In a known manner, the clipper scissors 4a, b each have a recess 21 widening towards the opposite clipper scissor. The recess 21 ends in a narrow recess 21a. For the movement of the clipper scissors 4a, b, different drives may be provided. In FIG. 2, a rotating drive 22 is provided, the rotary motion of the drive 22 being converted, as is schematically shown, into a linear back and forth movement via a gear. However, linear drives etc. are also basically possible. A rotation of the drive 22 by 360° here represents a complete motion cycle of the clipper scissors 4a, b from a maximum stroke to a minimum stroke and back. As an alternative, a drive shown in FIG. 3 may also be used, where the clipper scissors 4a, b are mounted on a plate 23 to rotate about axes A2 which in turn is rotating about the axis A1. By rotating the plate 23 about the axis A1, the clipper scissors may be moved into the sausage length and out of it again. By a rotation or a drive about the axes A2, the clipper scissors may be exactly aligned with respect to each other.

Figure 3:
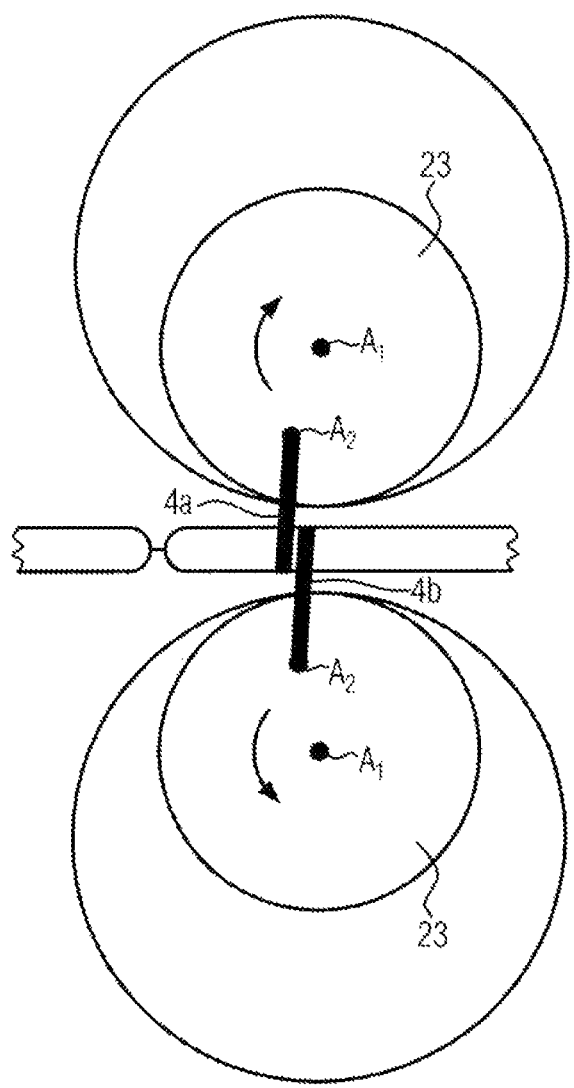
FIG. 3 roughly schematically shows a further embodiment for a drive of the clipper scissors.

The clipper mechanism for placing the clip is not represented in FIGS. 2 and 3 for the sake of simplicity. The mechanism for expanding a separation point, i. e. for moving the clipper scissors 4a, b in the direction of transport relative with respect to each other, is not represented for the sake of simplicity and assumed as known.

In the operation of the filling line shown in FIG. 1, functions of the filling machine 1 must be automatically matched in time to the functions of the clipping machine 2. In sausage production with the clipping machine 2, the following working steps are followed, as may also be taken from FIG. 4.

1. Filling machine: ejects a portion during the portioning time $t_{Portion}$ and stops after the set volume is reached, and stands still during the portioning pause $t_{Pause}$.

2. Clipping machine: displacement scissors 4a, b close during the portioning pause then product is displaced.

3. Clipping machine: expanding the separation point, the displacement scissors move apart, seen in the direction of transport.

4. Clipping machine: close portion with clip.

5. Clipping machine: displacement scissors 4a, b open again.

These steps are repeated cyclically.

Figure 4:
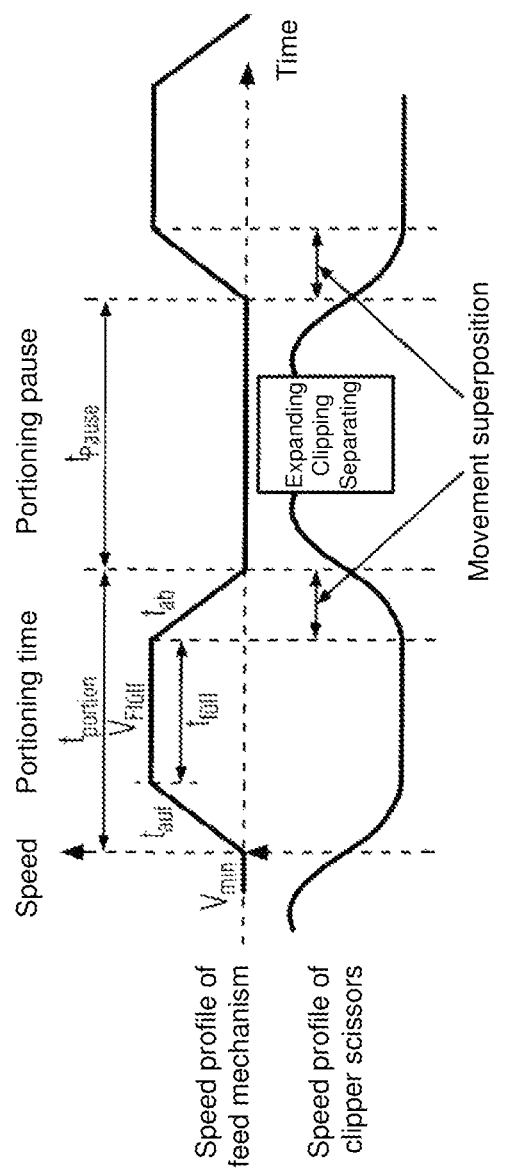
FIG. 4 shows a speed profile of a feed mechanism and a speed profile of the clipper scissors.

As can be taken from FIG. 4, there is a movement superposition of the movement of the clipper scissors and the feed mechanism. This is why the transitions from step 1 to step 2 and from step 5 to step 1 must be coordinated and optimized.

According to the present disclosure, it is now no longer necessary to adjust the machines manually and match their functions.

By the exchange of information via the communication interface 3, the manual readjustment of the clipping and filling machines is eliminated. Even if the filling speed or other parameters are changed, an automatic recalculation of the movement profiles and superpositions may be performed.

Figure 10:
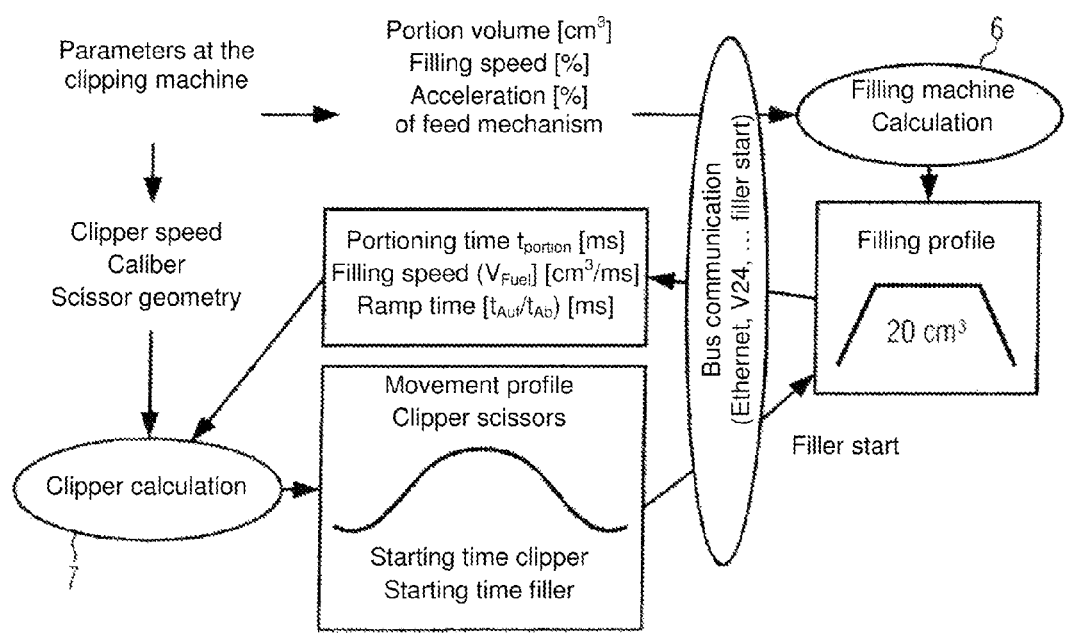
FIG. 10 roughly schematically shows a flow chart according to an embodiment of the present disclosure.

According to a preferred embodiment, this is accomplished e. g. as follows:

As may be taken in particular from FIG. 10, before the operation of the machine, parameters for the clipping machine and parameters for the filling machine 1 are entered. This may be done, for example, via the operator panel 10a shown in FIG. 1. For the filling machine, for example the desired portion volume [cm$^3$] may be entered as parameter. Moreover, the desired filling speed of the feed mechanism 5 may be entered. The filling speed may be indicated, for example, in percent, where 100% correspond to a maximum speed of the corresponding machine type. The acceleration of the feed mechanism from zero to the desired filling speed may also be entered. Here, too, the input may be entered as a percentage indication of a maximally possible acceleration for the machine type. The parameters of filling speed and acceleration are selected by the user depending on the product used and on the sausage casing. The entered parameters are then directed via a communication interface to the filling machine control system 6, as is represented in FIG. 10. If the input is alternatively done at the operator panel 10b, of course no parameter transmission between the clipping machine 2 and the filling machine 1 is required. The control system 6 calculates from these parameters, or optionally from equivalent parameters, a filling profile or a speed profile for the feed mechanism 5. The speed profile of the feed mechanism 5 indicates a speed in response to time, where, as can in particular also be taken from FIG. 4, the portion increases in a portioning time in a first ramp section during a first ramp time $t_{up}$ from a minimum filling speed $V_{min}$ to a maximum filling speed $V_{fill}$, and is kept at a high level for a filling time $t_{Fill}$, and is decreased again to $V_{min}$ in a second ramp section during a second ramp time $t_{down}$, where $V_{min}$ is zero here. If $V_{min} \neq 0$, i. e. the feed mechanism would continue at minimum speed, the start signal generated by the controlling system would cause the feed mechanism to be accelerated from this speed to the maximum filling speed, as can in particular be seen, for example, in FIG. 4 ($t_{up}$).

So, the result of this profile is the portioning time $t_{Portion}$ [ms], filling speed ($V_{fill}$) [cm$^3$/ms], i. e. the speed of the feed mechanism that is maximally reached, and the ramp times $t_{up}/t_{down}$ [ms]. The filling profile is calculated by functions stored in the control system. These data are transmitted again to the control system 7 of the clipping machine, for example via the communication interface. If the control systems 6 and 7 are integrated in a control unit, these information are forwarded from one control section to the other control section.

Figure 5:
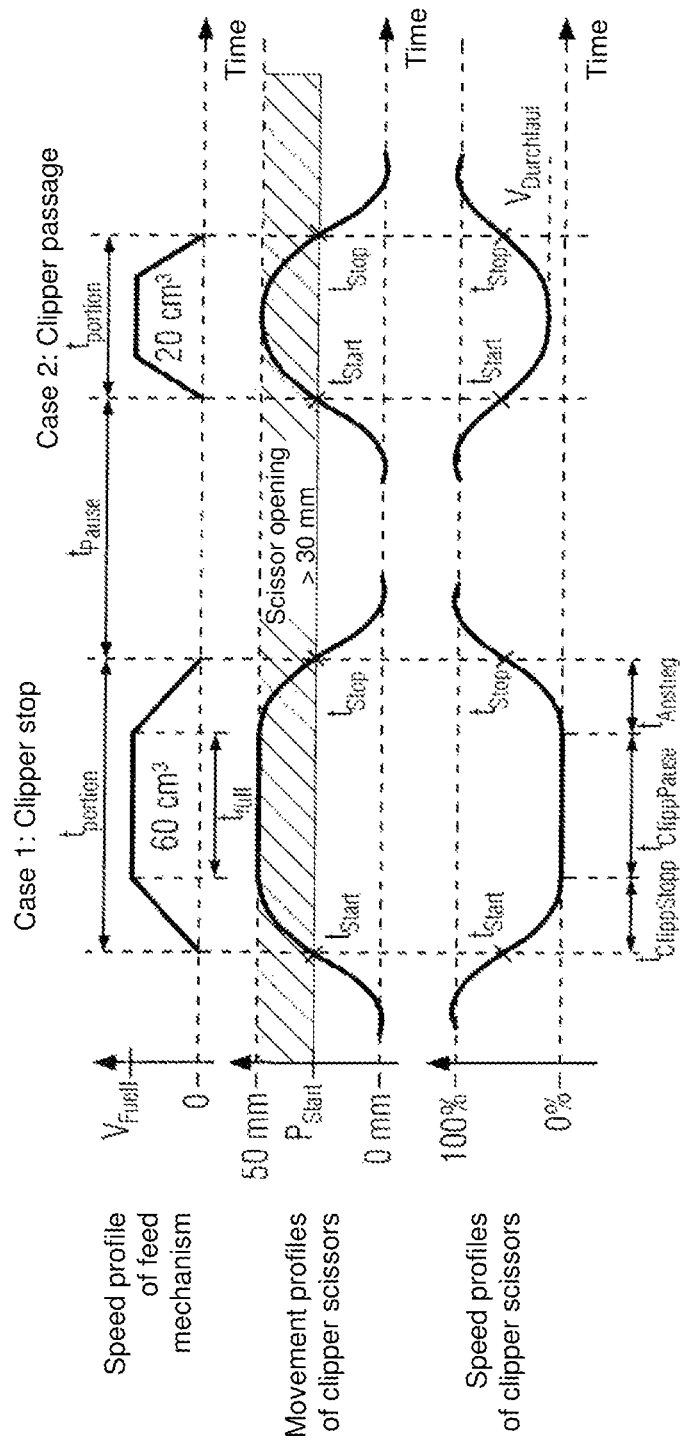
FIG. 5 shows a speed profile of the feed mechanism, a movement profile of the clipper scissors and the speed of the clipper scissors in response to time, which are arranged one underneath the other.

Parameters concerning the clipping machine 2 are, for example, entered at the operator panel 10a, or at the operator panel 10b. In this embodiment, the parameters are entered at the operator panel 10a. For the clipping machine, the clipper scissor speed at which the clipper scissors maximally move is entered. Here, the input may relate, for example, to the speed of a drive, or, depending on the nature of the clipper, to the actual speed of the clipper scissors perpendicular to the central axis of the sausage length or perpendicular to the direction of transport. Furthermore, the sausage caliber, i. e. the diameter of the portion to be produced, is entered. It is furthermore entered which type of clipper scissors 4a, i. e. which scissor geometry is used. For this, the input provides several options which correspond to certain predetermined types of scissors. If the scissors cannot be changed or an exchange is not intended, no scissor geometry must be entered. The used scissor geometry is then known and stored for further calculations. In response to these entered parameters and the speed profile of the feed mechanism, the clipper control system 7 computes the movement profile for the clipper scissors 4a, b, as is represented in FIG. 5 and will be illustrated more in detail below. Moreover, the control system 7 also calculates the corresponding speeds or the speed profile for the clipper scissors 4a, b, as is represented, for example, in FIG. 5. The control system 7 also calculates the starting point of the speed profile of the feed mechanism (t start) in response to the starting point of the movement profile of the clipper scissors, as will be illustrated more in detail below. The control system 7 then sends a signal for the start of the feed mechanism speed profile to the vacuum filler 1, as becomes clear by the arrow in FIG. 7.

As can be taken from FIG. 4 and FIG. 5, during the portioning time $t_{Portion}$ of the feed mechanism 5, the clipper scissors 4a, b move apart to a maximum distance with respect to each other, i. e. in a rotating drive, by a rotational movement up to 180°. In this concrete embodiment, the maximum linear movement perpendicular to the central axis M of the sausage length is 50 mm (maximum stroke) at a rotation of 180° of the drive.

Figure 6:
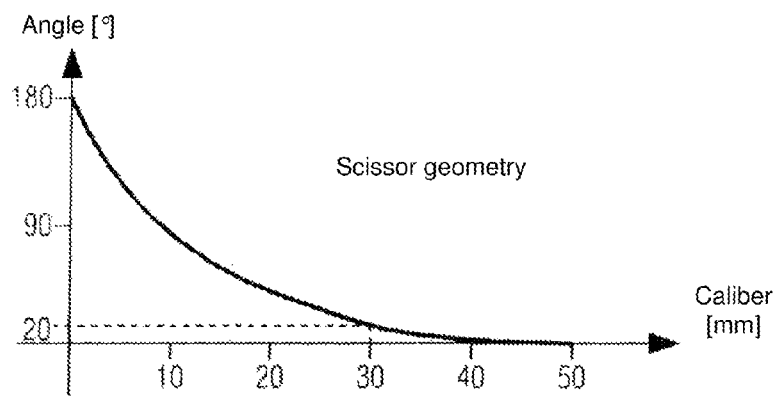
FIG. 6 shows an angle of rotation of the drive in response to a certain caliber of a portion.

In case 1 of FIG. 5, the clipper scissors remain in this position during the time $t_{Clippause}$ and move towards each other again during the portioning time. The scissor opening 8 is adjusted during the portioning time such that the scissors are in such a position during the portioning time $t_{Portion}$ that they have such a distance with respect to each other that the predetermined sausage caliber fits through the opening between the scissors. In the concrete embodiment, the scissor opening is here greater than 30 mm. This means, if the clipper scissors 4a, b move apart, as can be taken from the movement profile of the clipper scissors in FIG. 5, they have a distance with respect to each other at a point $t_{Start}$ which is sufficient for the predetermined portion to fit through the opening 8, which is seen in particular in FIGS. 7a and 7b. This point in time may be easily determined when the scissor geometry is known. In FIG. 6, the angle of rotation of the drive of 0 to 180° is plotted by way of example, where the 0° position corresponds to the maximum stroke or a maximum distance of a clipper scissor from the opposite scissor. There are corresponding curves for a certain geometry of the scissors which indicate in which position the clipper scissors 4a, b must be arranged or which distance they must have for a certain caliber to fit through. In the concrete embodiment, the predetermined caliber is 30 mm, resulting in an angle of 20°. This means that with an angle of rotation of the drive from 20° downwards (or 340°, depending on the sense of rotation), the clipper scissors 4a and 4b are each in a position in which the sausage portion fits through the scissors. The dependency of the angle of rotation on the caliber shown in FIG. 6 may be determined by trial, or it may be calculated and stored in the control system for different scissor geometries. This means that the control system 7 determines for a point in time $t_{Start}$ that the portioning time may begin and a signal is sent from the control system 7 to the filling machine control system 6. At the end of the portioning time $t_{Portion}$, the movement profile of the clipper scissors is adjusted such that they have exactly the distance with respect to each other as at $t_{Start}$, so that the sausage portion with the predetermined caliber still fits through.

During the portioning pause, the scissors then move again towards each other as may in particular be seen in FIG. 4. This means that the point $t_{Start}$, which in this embodiment corresponds to a certain angle of rotation, is a function of the caliber and the scissor geometry. So, the clipper scissor position at which the portion fits through the scissors may be calculated from the set caliber and the scissors installed in the machine.

FIG. 5 also shows for case 1 the speed profile of the clipper scissors at the point in time $t_{Start}$ at which the clipper scissors are located in a position $P_{Start}$. The speed of the clipper scissors here decreases to zero during a time $t_{Clipstopp}$. So, the clipper stopping time is the time from position $P_{Start}$ of the clipper scissors to the maximum opening of the clipper scissors, i. e. here to the 0° position of the rotary drive. The period $t_{Clipstopp}$=f ($P_{Start}$, clipper scissor speed, clipper scissor acceleration); during the time $t_{Clippause}$, the clipper scissors stand still. The clipper scissor acceleration may be stored in the control system of the clipping machine as a fixed value or entered as a parameter by the operator.

Clipper pausing time: $t_{Clippause}=t_{Portion}-2\times t_{Clipstopp}$. The clipper pausing time is in case 1 greater than zero, therefore the clipper is waiting in the 0° position during this time, i.e. the maximally opened position of the clipper scissors. After the clipping pause, speed increases again with the determined clipper acceleration where at a point in time $t_{Stopp}$ corresponding to the end of the portioning time, the scissors are again in position $t_{Start}$.

Case 1 was now described for the case of a relatively large portion of 60 cm³, where with a given clipper acceleration, the clipper scissors are waiting.

Case 2 shows a smaller portion of, for example, 20 cm³, such that a shorter time $t_{Portion}$ results. In this case, the formula $t_{Clippause}=t_{Portion}-2\times t_{Clipstopp}$ gives a value smaller than zero. This means that the clipper works in continuous operation with a passage speed $V_{passage}$, i. e. the clipper scissors do not stand still. The passage speed $V_{passage}=f(t)_{Portion}, t_{Clipstopp}$), i e. the passage speed, results by the superposition of the functional sections, i. e. the ramps in the time segments $t_{Clipstopp}$ and $t_{rise}$ ($t_{Clipstopp}=t_{rise}$) with a given acceleration or deceleration. The intersecting point of the functional sections results in the passage speed.

The calculation of the clipper scissor speed is here one example. It is essential that $t_{Start}$ and $t_{Stopp'}$ are at the beginning and at the end of the portioning time $t_{Portion'}$ and the position of the scissors at the times $t_{Start}$ and $t_{Stop}$ are at least in a position≥$P_{Start}$, preferably=$P_{Start}$.

Thus, depending on the filling profile or the speed profile of the feed mechanism, the movement profile of the clipper scissors during the portioning time may be adjusted. The length of the portioning pause $t_{Portion}$ does not depend on the filling profile but depends on the rotational speed of the clipping machine, the time for expanding the clipper scissors, the clipping and the separation. In the region $t_{Pause}$, the clipper speed increases again corresponding to a predetermined clipper acceleration to a maximum clipper speed corresponding to the set clipper scissor speed, 100%, as is shown in FIG. 5. Then, expanding, clipping and separation are performed, as can in particular be seen in FIG. 4. At the end of the portioning pause, the clipper scissor speed decreases again, as can be seen in particular in FIG. 4, such that the clipper scissors are located again in position $P_{Start}$ at the beginning $t_{Start}$ of the portioning time $t_{Portion}$.

Figure 7C:
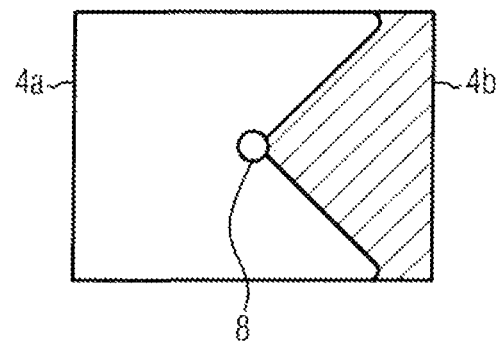
FIG. 7c roughly schematically shows a position of two clipper scissors in a separation position.

In the displacement during the positioning pause, as is shown in FIG. 7c, the clipper scissors move towards each other, for example, to a preset maximum position, for example the 180° position of the drive. The product is displaced and the point of contraction is in the opening 8 which now only corresponds to the superimposed end regions 21a of the scissors. For placing the clip, the two clipper scissors 4a, b are then moved apart in the direction of transport TR whereby the separation point is expanded. Then, the clip or double clip is placed. One may optionally separate the sausage portion with a cutting device, or the sausage portions remain linked together and may then be suspended on the suspension device 18.

In the previous embodiments, the controlling system, in particular the control system 7, gave the start signal to the feed mechanism at a point in time $t_{Start}$ at which the clipper scissor position $P_{Start}$ was such that the distance of the clipper scissors 4a, b was so long that a predetermined entered sausage caliber, as was illustrated in connection with FIG. 6, just fits through the clipper scissors in the corresponding position of the scissors.

However, it is also possible to start the feed mechanism 1 somewhat earlier.

Figure 8:
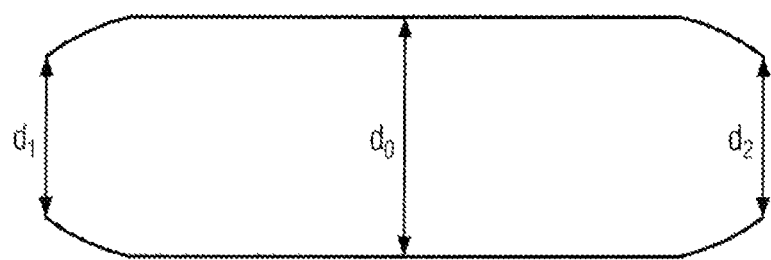
FIG. 8 roughly schematically shows a produced sausage portion.

FIG. 8 roughly schematically shows a produced filled sausage length during a portioning time. One can see here that the sausage caliber d is not constant over the complete sausage portion. In a central region, the sausage caliber corresponds to the set sausage caliber $d_0$. However, like in the end regions, round ends of the sausage of a smaller diameter $d_1$ (at the beginning of the sausage portion) and $d_2$ (at the end of the sausage portion) are produced. This variation of the sausage caliber results from the fact that at the beginning of the portioning, the feed mechanism only starts, and it moreover results depending on the diameter of the filling tube and the compressibility of the ejected pasty mass.

Figure 9:
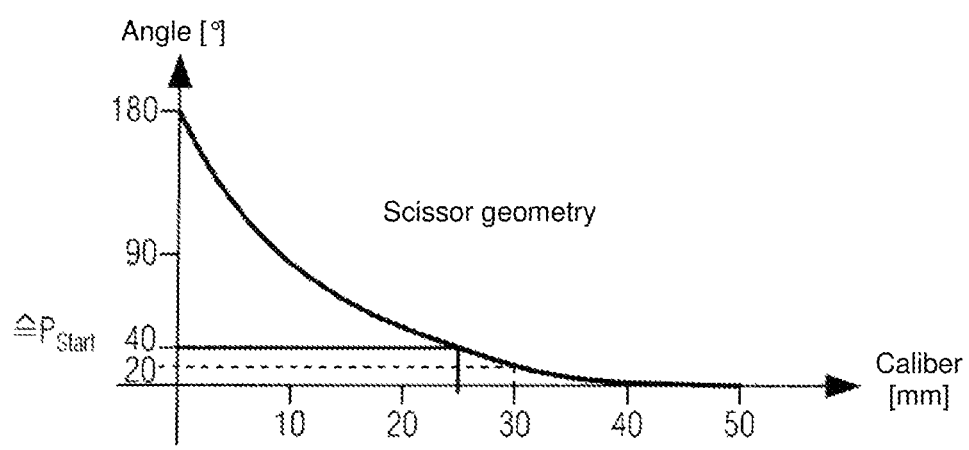
FIG. 9 shows the diagram shown in FIG. 6 according to a further embodiment.

According to a further embodiment, the controlling system, preferably the control system 7, may already emit a start signal to the feed mechanism 5 when the scissors are in such a position with respect to each other that e. g. the produced sausage caliber $d_1$ fits through the scissors, or a sausage caliber within a range of $d_1$ to $d_0$. As can be taken from FIG. 9, due to the smaller diameter within a range between $d_1$ and $d_0$, here e. g. 25 mm instead of the 30 mm, the corresponding position ($P_{start}$) of the clipper scissors may be determined, so that here an angle of rotation of the drive of 40° instead of 20° results as of which the produced sausage portion fits through the scissors, so that no backing-up of the pasty mass occurs. The ratio of $d_0$ to $d_1$ may be determined by trial. Since the internal mass is completely displaced during clipping at the point of separation and a tress is formed, the smallest diameter may be formed at this point only by the folded sausage casing. Here, $d_1$ may be=2 to 10% of $d_0$ ($d_1 \simeq d_2$). So, if the scissors open already at a reduced caliber within a range of $d_1$ to $<d_0$, one then has to take care that the scissors move apart sufficiently quickly such that the produced sausage length, whose diameter increases to $d_0$, would always fit through the pair of scissors without any backing-up occurring. The same applies to the position of the clipper scissors $P_{Start}$ at a point in time $P_{Stop}$, i. e. at the end of the portioning time. It is, however, essential that during the portioning time, the clipper scissors have a sufficient distance so that the produced sausage length fits through the opening between the scissors. So, the start signal should be generated at the earliest at the time $d_1$, and at the latest at a time where the position $P_{Start}$ of the clipper scissors is such that the set sausage caliber $d_0$ just fits through.

The invention claimed is:

1. A method for controlling a filling machine with a clipping machine, comprising
   a clipping machine and a filling machine exchanging process data via a communication interface, such that
   functions of the clipping machine, including a movement profile of opposed clipper scissors, and
   functions of the filling machine, including the speed profile of a feed mechanism,
   are automatically matched by a controlling system:
   periodically repeating the speed profile of the feed mechanism in feed mechanism cycles, and determining the starting time ($t_{Start}$) of a feed mechanism cycle in response to the position of the clipper scissors, and the controlling system; and
   the controlling system sending a start signal to the feed mechanism at the earliest when the distance of the clipper scissors with respect to each other is sufficiently long for a produced sausage caliber to fit through the opening of the clipper scissors.

2. The method according to claim 1, including
   entering clipper parameters for the function of the clipping machines;
   entering filling parameters for the function of a feed mechanism of the filling machine;
   setting up, via a first control system of the controlling system the speed profile of the feed mechanism in response to the filling parameters; and
   determining, via a second control system of the controlling system in response to the clipper parameters and the speed profile of the feed mechanism, a movement profile for the clipper scissors.

3. The method according to claim 2, including setting as clipper parameters:
   sausage caliber and clipper scissor speed.

4. The method according to claim 3, including additionally setting as clipper parameters clipper scissor geometry.

5. The method according to claim 3, including additionally setting as clipper parameters clipper scissor acceleration.

6. The method according to claim 2, including setting as filling parameters:
   portion volume, filling speed, and acceleration of the feed mechanism to the filling speed.

7. The method according to claim 2, and sending a corresponding start signal, via the second control system, to the feed mechanism.

8. The method according to claim 1, and determining for the speed profile of the feed mechanism: a portioning time during which the feed mechanism ejects product, and a filling speed ($V_{fill}$), and the ramp times ($t_{up}/t_{down}$) during which the feed mechanism is accelerated to the filling speed ($V_{fill}$) and the filling speed ($V_{fill}$) decreases again.

9. The method according to claim 1, and adjusting the parameters for the clipping machine and the parameters for the filling machine at an operator panel at the clipping machine.

10. The method according to claim 1, and combining the first and the second control systems in a common controlling system.

11. The method according to claim 1, the speed profile of the feed mechanism indicating a speed in response to time, wherein
during a portioning time $t_{Portion}$ in a first ramp section during a first ramp time $t_{up}$, the speed increases from a minimum filling speed $V_{min}$ to a maximum filling speed $V_{fill}$ and is kept on said high level for a filling time $t_{fill}$, and is decreased again to $V_{min}$ in a second ramp section during a second ramp time $t_{ab}$,
where during a following portioning pause during a period tPause, the filling speed corresponds to $V_{min}$
where during the portioning time ($t_{Portion}$), the speed of the clipper scissors is decreased to a passage speed ($V_{passage}$), and increases again, where $V_{passage} \neq 0$.

12. The method according to claim 11, and during the portioning time $t_{portion}$, when the filling speed decreases again to $V_{min}$ in the second ramp section, $V_{min}$ decreases to $V_{min}=0$.

13. The method according to claim 11, and during the following portioning paused period, the filling speed $V_{min}=0$.

14. The method according to claim 1, wherein during the portioning time, the speed of the clipper scissors is decreased to 0 during a first time segment ($t_{Clipstopp}$), and is kept at 0 during a certain period ($t_{Clippause}$), and is then increased again during a second time segment ($t_{rise}$).

15. The method according to claim 1, the movement profile of the clipper scissors representing the degree of movement of the clipper scissors in response to time, and
during a portioning time $t_{Portion}$ of the feed mechanism, the clipper scissors (4a, b) move apart to a maximum distance and then move towards each other again, where the scissors have, during the portioning time ($t_{Portion}$) of the feed mechanism, such a distance with respect to each other that the produced sausage caliber fits through the opening between the scissors.

16. The method according to claim 1, and during the portioning pause of the feed mechanism, moving the clipper scissors towards each other to such an extent that the sausage length is cut through, whereupon the clip or double clip is placed between the clipper scissors, and whereupon the scissors move apart again, where at the beginning of the following portioning time ($t_{portion}$), the scissors have such a distance with respect to each other that the produced sausage caliber fits through the opening between the scissors where the corresponding position ($P_{Start}$) of the clipper scissors is automatically determined by the control system as a function of the clipper scissor geometry and the set sausage caliber.

17. A system having a device for controlling a filling machine, comprising: a filling machine, a clipping machine, a communication interface between the filling machine and the clipping machine for exchanging process data, and at least one controlling system that automatically matches functions of the clipping machine, and functions of the filling machine, wherein the clipping machine and the filling machine exchange process data via the communication interface, the at least one controlling system periodically repeating the speed profile of the feed mechanism in feed mechanism cycles, and determining the starting time ($t_{Start}$) of a feed mechanism cycle in response to the position of the clipper scissors, and the at least one controlling system, and the at least one controlling system sending a start signal to the feed mechanism at the earliest when the distance of the clipper scissors with respect to each other is sufficiently long for a produced sausage caliber to fit through the opening of the clipper scissors.

18. The system according to claim 17, the at least one controlling system comprising a first control system which sets up a speed profile of a feed mechanism in response to entered filling parameters, and a second control system which determines a movement profile for clipper scissors of the clipping machine in response to entered clipper parameters and the speed profile of the feed mechanism.

19. A system according to claim 17, and in the at least one controlling system, the starting time of a feed mechanism cycle is determined in response to the position of the clipper scissors.

20. The system according to claim 17, and in the at least one controlling system that automatically matches functions of the clipping machine and functions of the filling machine the matched functions of the clipping machine include a movement profile of the opposed clipper scissors.

21. The system according to claim 17, and in the at least one controlling system that automatically matches functions of the clipping machine and functions of the filling machine, the matched function of the filling machine include a speed profile of a feed mechanism of the filling machine.

\* \* \* \* \*